United States Patent
Jost

(10) Patent No.: US 6,220,178 B1
(45) Date of Patent: Apr. 24, 2001

(54) FREIGHT CARS, ESPECIALLY FOR TRANSPORTING DRY BULK MATERIAL

(75) Inventor: Dieter Jost, Feucherolles (FR)

(73) Assignee: Railtrans S.A. (FR)

( * ) Notice: Subject to any disclaimer, the term of this patent is extended or adjusted under 35 U.S.C. 154(b) by 0 days.

(21) Appl. No.: 09/271,925

(22) Filed: Mar. 17, 1999

(51) Int. Cl.[7] .................................................. B61D 19/00
(52) U.S. Cl. .................... 105/355; 105/377.04; 105/378; 105/258; 105/260; 296/181; 296/883; 296/36
(58) Field of Search ................ 105/377.01, 377.02, 105/377.03, 377.04, 377.05, 377.1, 355, 363, 378, 258, 260; 296/181, 183, 36, 51

(56) References Cited

U.S. PATENT DOCUMENTS

| | | | |
|---|---|---|---|
| 1,628,543 | * 5/1927 | Jonsson | 105/363 |
| 2,877,722 | * 3/1959 | Peat | 105/377 |
| 3,792,667 | * 2/1974 | Paton | 105/404 |
| 4,024,671 | * 5/1977 | Isobe | 49/104 |
| 4,341,413 | * 7/1982 | Woods | 296/50 |
| 5,076,174 | * 12/1991 | Martin | 105/377 |
| 5,542,734 | * 8/1996 | Burchett et al. | 296/100 |

FOREIGN PATENT DOCUMENTS

| | | | |
|---|---|---|---|
| 1 530 076 | 9/1969 | (DE) . | |
| 2 007 268 | 11/1970 | (DE) . | |
| 4006532A1 | * 5/1991 | (DE) | B62D/33/04 |
| 40 06 532 A1 | 9/1991 | (DE) . | |

* cited by examiner

Primary Examiner—S. Joseph Morano
Assistant Examiner—Frantz F. Jules
(74) Attorney, Agent, or Firm—Robert W. Becker & Associates

(57) ABSTRACT

The freight car has an undercarriage and a running carriage connected to the undercarriage. A container is connected to the undercarriage. The container has side walls, positioned in the longitudinal direction of the freight car, and closed end walls extending transversely to the side walls at opposite ends of the freight car. The side walls have lateral posts and longitudinal supports connecting the end walls and the laterals posts. At least one of the side walls has a closable opening for loading and unloading goods to be transported in the freight car. The at least one opening extends over the entire length of the side wall. The at least one side wall has at least one pair of folding doors arranged in a common vertical plane for closing the opening in a closed position of the folding doors. Each one of the folding doors of the pair has a horizontal pivot axis. The horizontal pivot axle of the first one of the folding doors is provided at the undercarriage and the first folding door covers a lower part of the side wall. The horizontal pivot axle of the second one of the folding doors is provided in the vicinity of the longitudinal support and the second folding doors covers an upper part of the side wall.

25 Claims, 9 Drawing Sheets

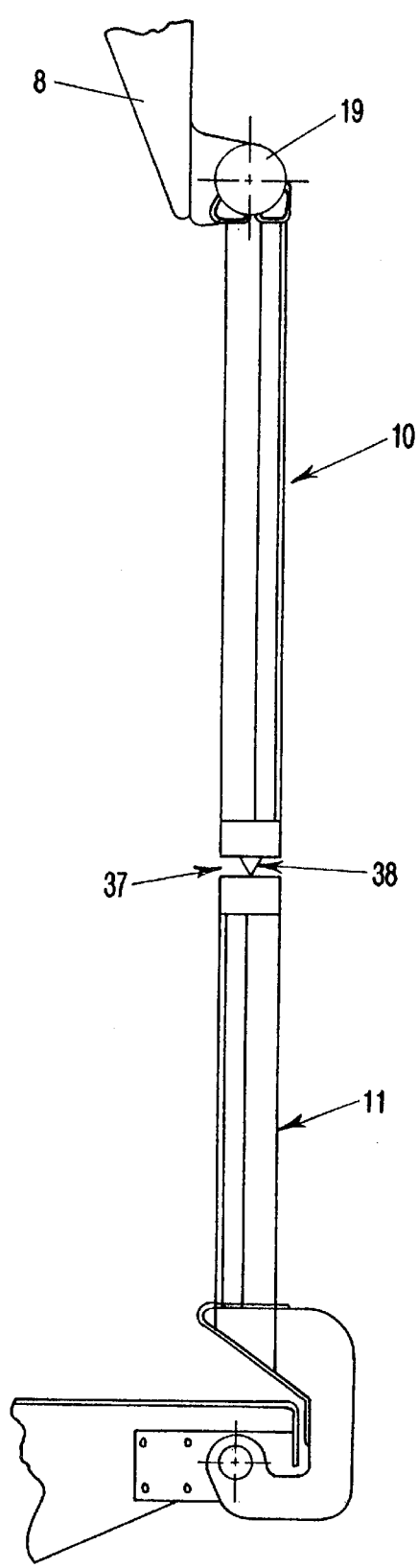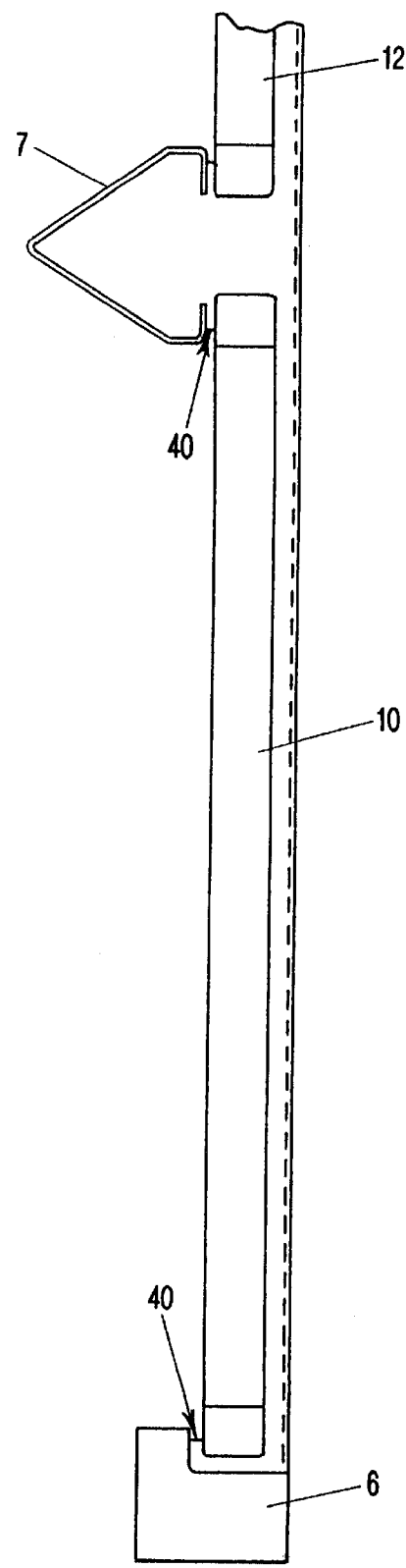
FIG-5                    FIG-6

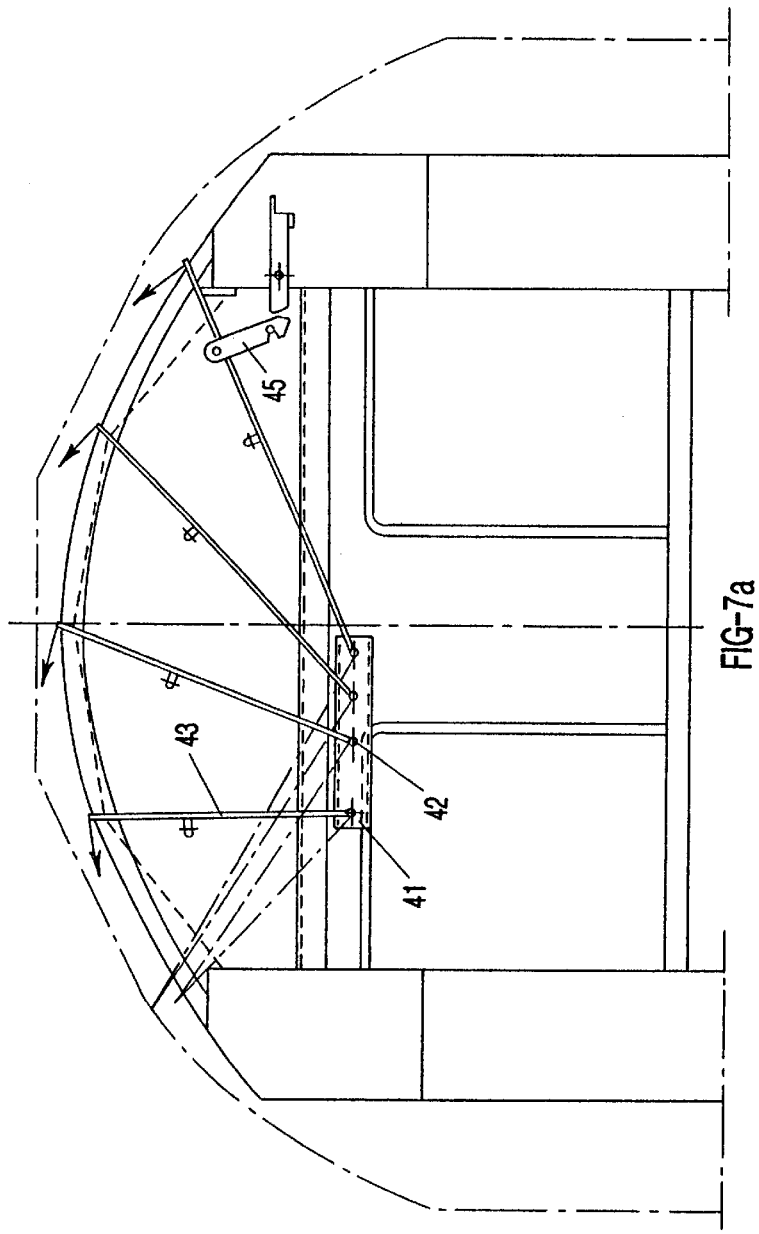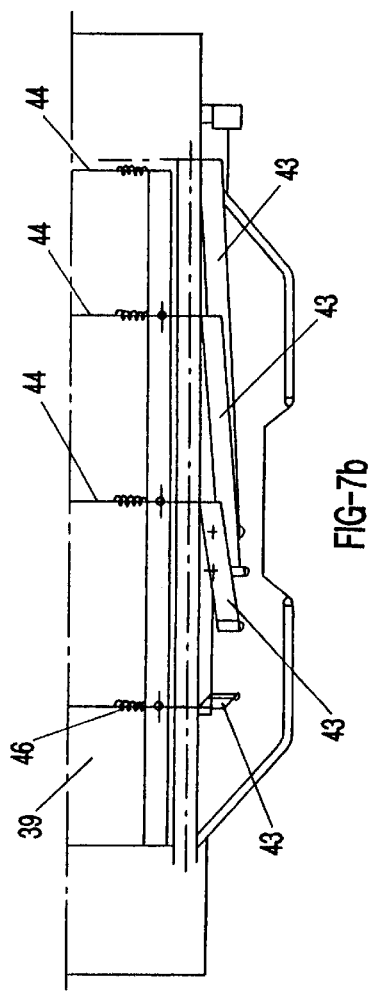

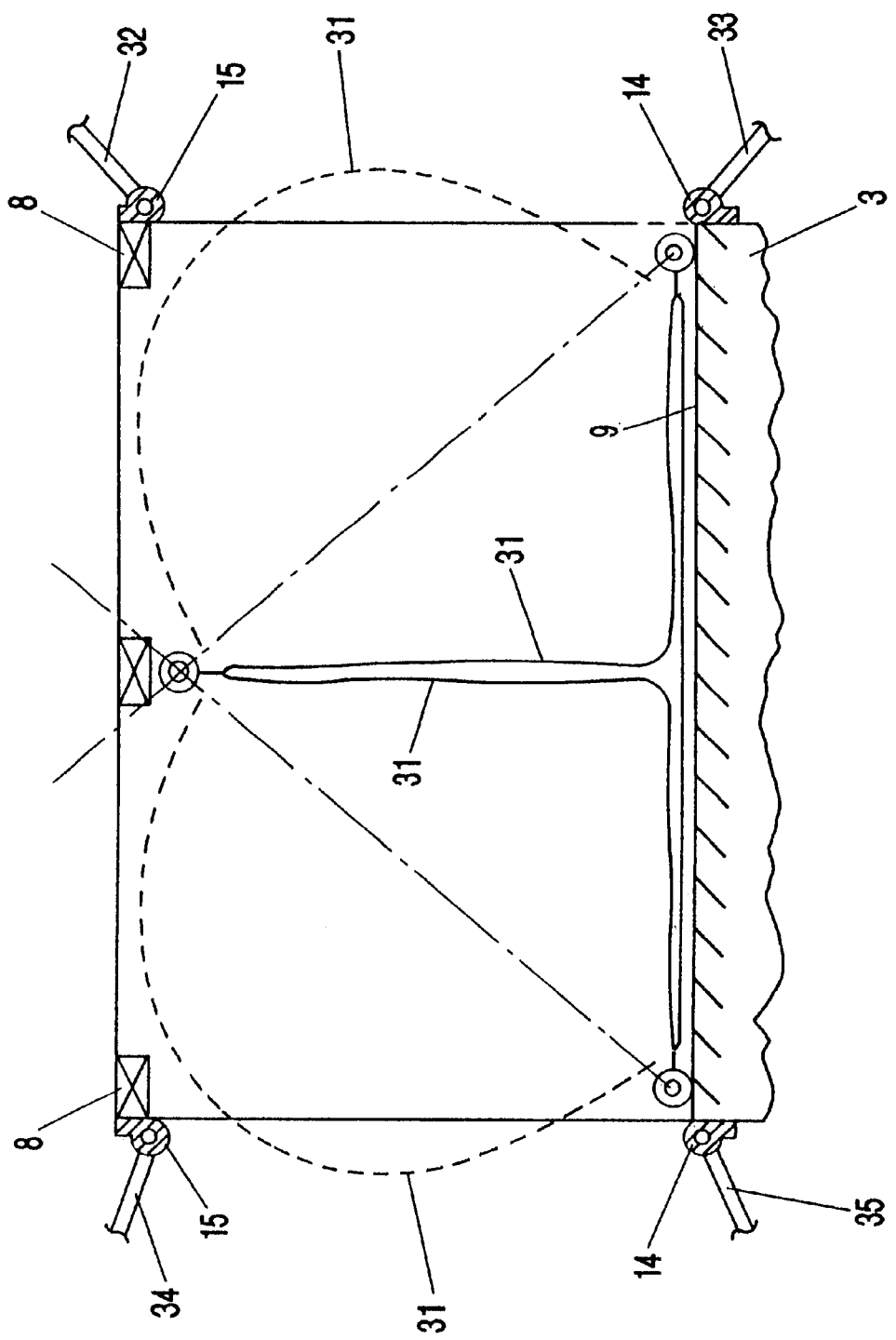

FREIGHT CARS, ESPECIALLY FOR TRANSPORTING DRY BULK MATERIAL

BACKGROUND OF THE INVENTION

The present invention relates to a freight car comprising of a running carriage, an undercarriage, and a box-shaped container connected to the two and comprised of a framework with end walls, lateral posts, and longitudinal supports connecting the end walls and the lateral posts. The end walls are closed while one or both of the side walls have a closable opening for loading and unloading.

Freight cars are used for transporting goods on rail and must comply with different specifications in order to accommodate the different types of goods to be transported. In principle, it is desired to be able to transport as many different goods as possible with a minimal number of differently designed freight cars. For example, it may be desired to transport within a single type of freight car raw materials such as wood cuttings for producing partical board, wood flooring (parquet) and similar wood products into the processing plant, and, subsequently, after removal of the wood chips to use the same freight car for the finished products, in the disclosed scenario, for example, for the transport of partical board to the customer. In this context it is especially important that loading and unloading can be performed in the shortest possible time and to ensure during transport within the freight cars that sensitive raw products and finished products are not damaged. The basic goal of freight transportation is to shorten the transfer times by employing specially designed freight cars for the different types of goods and by using special loading and unloading devices.

In general, each freight car is substantially comprised of a running carriage with at least two axles, an undercarriage with brake devices and pull and push devices, and a type of container which is either fixedly connected to the undercarriage( by screwing, riveting or welding) or movably, e.g., pivotably, thereto. The undercarriage is the actual main support body for receiving the vertical load, the bumper forces, and the pulling forces as well as vertical and lateral mass forces caused during transport. The construction of the container, on the other hand, is basically dependent on the specifications for the goods to be transported with respect to quantity as well as quality as well as the conditions for loading and unloading. In addition to vessel type containers or funnel-shaped containers, freight cars, in general, have a box-shaped container comprised of a frame work of rolled profiled members that provide a truss system with lateral posts and connecting upper longitudinal supports. The cars may be open in the upward direction or covered or maybe provided with a closable roof structure and may have openings for loading and unloading. Open freight cars allow access to the cargo space from above while cars with a fixed cover and lateral sliding doors or double doors at the end walls, opening the entire cross-section of the box container for loading through the respective ends, are provided.

Especially for the transport of dry bulk materials such as wood chips etc., which are used in the paper industry or for producing wood products such as partical board, it is disadvantageous that for loading or unloading only small openings are provided either by the double doors at the end walls or by lateral sliding doors and that for opening and closing of these doors great forces must be applied against the resistance of the load to be transported.

It is therefore an object of the present invention to provide a freight car of the aforementioned kind that avoids the aforementioned disadvantages and provides for loading and unloading from above or through the side walls, over the entire roof cross-section, or side wall cross-section whereby opening and closing of the loading and/or unloading openings can be performed in a simple manner manually without requiring excessive forces.

SUMMARY OF THE INVENTION

This object is inventively solved in that the opening extends over the entire side wall area and is closed by two correlated folding doors that open the entire height of the side wall. The folding door covering the entire or a portion of the lower part of the side wall is pivotably connected at the undercarriage and the other folding door covering the entire or a portion of the upper half of the side wall is positioned in the same vertical plane and connected to the upper longitudinal support or the upper portion of the frame work. With respect to the pivot forces to be applied (opening and closing forces) a balanced coupled kinetic mechanism is provided that takes into consideration the weight of car door and compensates substantially the pivot forces. Preferably, the lower folding door has a reduced height relative to the upper folding door and thus also has a reduced weight. A coupling device is provided at least at one of the two ends of the folding doors in a form of a chain arranged in a figure eight and providing a chain drive. It is connected to the pivot shafts of the folding doors by chain gears mounted on the pivot shafts. This allows in a simple manner a quasi automatic opening and closing of the folding doors after release of a securing device whereby the operator, by applying a minimal force onto a lever, can overcome the initial frictional forces of the coupled kinetic mechanism of both door weights. Accordingly, the entire side wall area is available for loading or unloading of the freight car with the goods to be transported since the folding doors are folded in the upward, respectively, downward direction.

Since the folding doors for very long freight cars have a considerable length, in a preferred embodiment of the invention it is suggested to provide centrally at the folding door a center hold. Furthermore, it is advantageous to position the pivot mechanism of the lower folding door below the bottom of the container so that the lateral opening of the container allows direct access to the bottom as a planar loading surface of the container without having any obstructions by hinges, axles (shafts) etc. or other connecting means for connecting the lower folding door to the freight car.

The upper folding door can advantageously be secured by a stop in its open position in a substantially vertical position in order to reduce the initial closing forces.

For transporting sensitive goods, for example, moisture-sensitive wood cuttings or wood products, according to one embodiment of the invention it is suggested to seal the folding doors relative to one another and relative to the bordering parts of the container with sealing elements. Also, a cover for the container is provided, especially in the form of a rigid cover that is embodied as a pivot cover. This allows to hermetically seal the cargo space so as to close it off in a water-tight manner. However, the loading and unloading process can be simply carried out by folding the folding doors and pivoting the cover and can thus be performed in the shortest possible amount of time. In addition, an unloading device in the form of an air bag may be provided which is comprised of an envelope resting on the bottom of the container and inflatable. In the inflated state, the air bag will occupy the volume (cargo space) of the container. Dry bulk materials in this manner can be transported while resting on the deflated envelope and, upon inflating the air bag, can be actively pushed out of the container, especially when according to a preferred embodiment the air bag in the deflated state lies on the bottom of the container and provides a vertical wall which extends substantially over the entire height of the container and is positioned opposite the unloading opening.

For further accelerating the loading and unloading process, it may be suggested to provide both side walls with corresponding folding doors. For very long freight cars, it may be advantageous to divide the side walls, respectively, the folding doors at the center so that a total of four folding doors are provided on one or both side walls. This also widens the range of possibilities for transporting different goods.

BRIEF DESCRIPTION OF THE DRAWINGS

The object and advantages of the present invention will appear more clearly from the following specification in conjunction with the accompanying drawings, in which:

FIG. 5 shows in an enlarged representation a schematic side view of the folding doors;

FIG. 6 shows in an enlarged representation schematically the folding doors of FIG. 5;

FIGS. 7a,b show a schematic end view of the freight car with the cover pivoted and a plan view shown below (FIG. 7b);

FIG. 10 shows a freight car with air bag in a schematic cross-sectional view.

DESCRIPTION OF PREFERRED EMBODIMENTS

Figure 1:
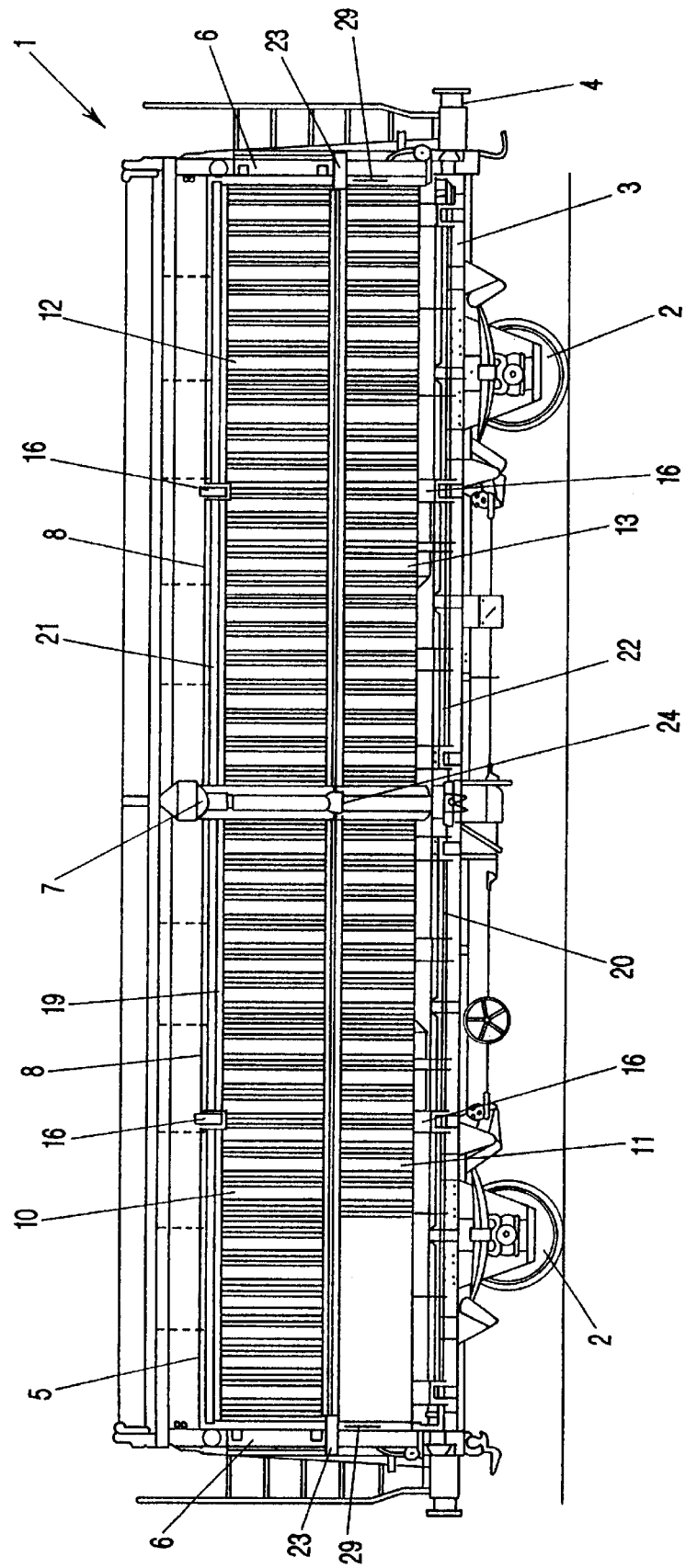
FIG. 1 shows a freight car with four closed folding doors in a schematic side view.

The present invention will now be described in detail with the aid of several specific embodiments utilizing FIGS. 1–10. The freight car 1 represented in FIG. 1 is used in a closed-coupled freight train. The freight car 1 comprises a two-axle running carriage 2 that is connected in a manner not disclosed in this context to an undercarriage 3 comprised of a welded profiled frame work positioned substantially at the level of the bumper 4 which receives and compensates the vertical load as well as the bumper forces and pulling forces and the vertical as well as lateral mass forces resulting during running. The undercarriage 3 comprises a box-shaped container 5 comprised of a frame work including end walls 6, lateral posts 7, and longitudinal supports 8 connecting them, whereby the container bottom 9 rests on the undercarriage 3 and receives the goods to be transported. Since the end walls 6 are closed, it is suggested to provide openings in the side walls, for loading and unloading whereby the openings extend over the entire length of the side walls and whereby in addition closable roof opening is provided.

The opening in the side wall is provided in the inventive freight car 1 by at least two correlated folding doors opening over the entire height of the side walls, whereby in the shown embodiment four such folding doors 10, 11, 12 and 13 are provided. Preferably, both side walls of the freight car 1 are provide with a set of four folding doors. Accordingly, the shown freight car 1 is provided with a total of eight folding doors which are schematically represented in the closed position in FIG. 1 and in the open position in FIG. 2. Each lower folding door 11, respectively, 13 extends in the longitudinal direction of the freight car and has a height that is somewhat smaller than half the height of the side wall area of the container 5 and is either directly arranged at the plane of the loading edge of the bottom 9 or, in the shown embodiment, below the bottom 9 so as to be pivotable about a pivot axle 14. Above each one of the lower folding doors 11, 13 the correlated folding doors 10, 12 are arranged in the same vertical plane. The upper end lower folding doors 10–13 together close off the opening. The four paired folding doors 10–14 essentially provide the longitudinal side wall of the freight car 1. The upper folding doors 10, 12 extend in the longitudinal direction across the upper half of the freight car and can be pivoted upwardly about pivot axle 15 which is arranged at the level of the upper longitudinal support 8 of the freight car 1.

At each longitudinal side wall of the freight car, four folding doors of the aforementioned kind are provided in the disclosed embodiment in order to allow a simple and variable loading and unloading to both sides even for a very long freight car of more than 12 meter length. The lateral posts 7 for securing and suspending the folding doors are positioned at the center of the car. The folding doors 10, 11, 12, 13 can also be additionally secured at their respective center by a center hold 16 provided at the undercarriage 3, respectively, the container 5.

In order to ensure easy and paired opening and closing of the folding doors 10 and 11, respectively, 12 and 13, a compensation of both door weights is provided by a balanced coupled kinetic mechanism of the folding door pairs in that the pivot forces are substantially compensated. For this purpose, the lower folding door 11, respectively, 13 has a reduced height and a reduced weight in comparison to the folding door 10, respectively, 12 of each pair. By providing a coupling device at least at one of the two ends (viewed in the longitudinal direction of the freight car) of the folding doors 10, 11, respectively, 12, 13 in the form of a chain drive having a 17, 18 arranged in a figure eight about pivot shafts 19, 10, 21, 22 of the folding doors 10, 11, 12, 13 respectively, the chain gears mounted on the shafts. It should be noted that instead of the chain drive any other coupling devices can be used, for example, a belt drive. Important in this context is the movement reversal due to the figure eight arrangement which is indicated by the arrows in FIG. 4 illustrating the closing direction of the doors as well as the kinetic and weight-related balancing such that opening or closing of the folding doors can be performed with minimal force expenditures substantially automatically by hand.

The folding doors 10, 11, respectively, 12, 13 in their closed position are locked by a manually releasable latching mechanism. For this purpose, each end wall 6 is provide with a pivot latch 23 that can be pivoted across the folding doors 10, 11, 12, 13 for locking so that in this position of the pivot latch 23 the folding doors cannot open. As a further securing device a sliding latch 24 is provided centrally at the lateral posts 7 which can be used in order to lock the folding doors 10–13 in the closed position to prevent their opening. Only after manual release of the latch mechanism the door actuation is possible.

Figure 2:
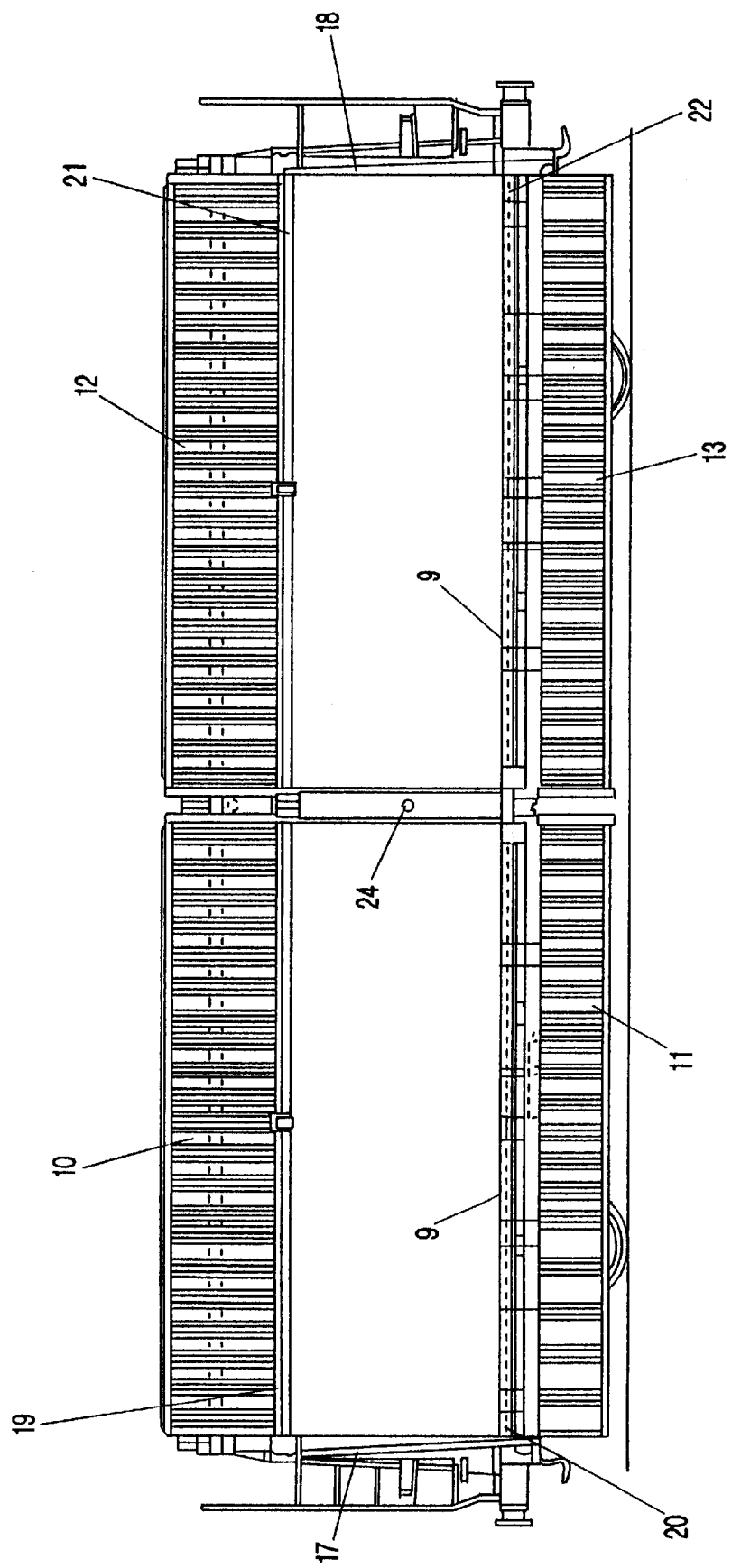
FIG. 2 shows the freight car of FIG. 1 with open folding doors.
Figure 3:
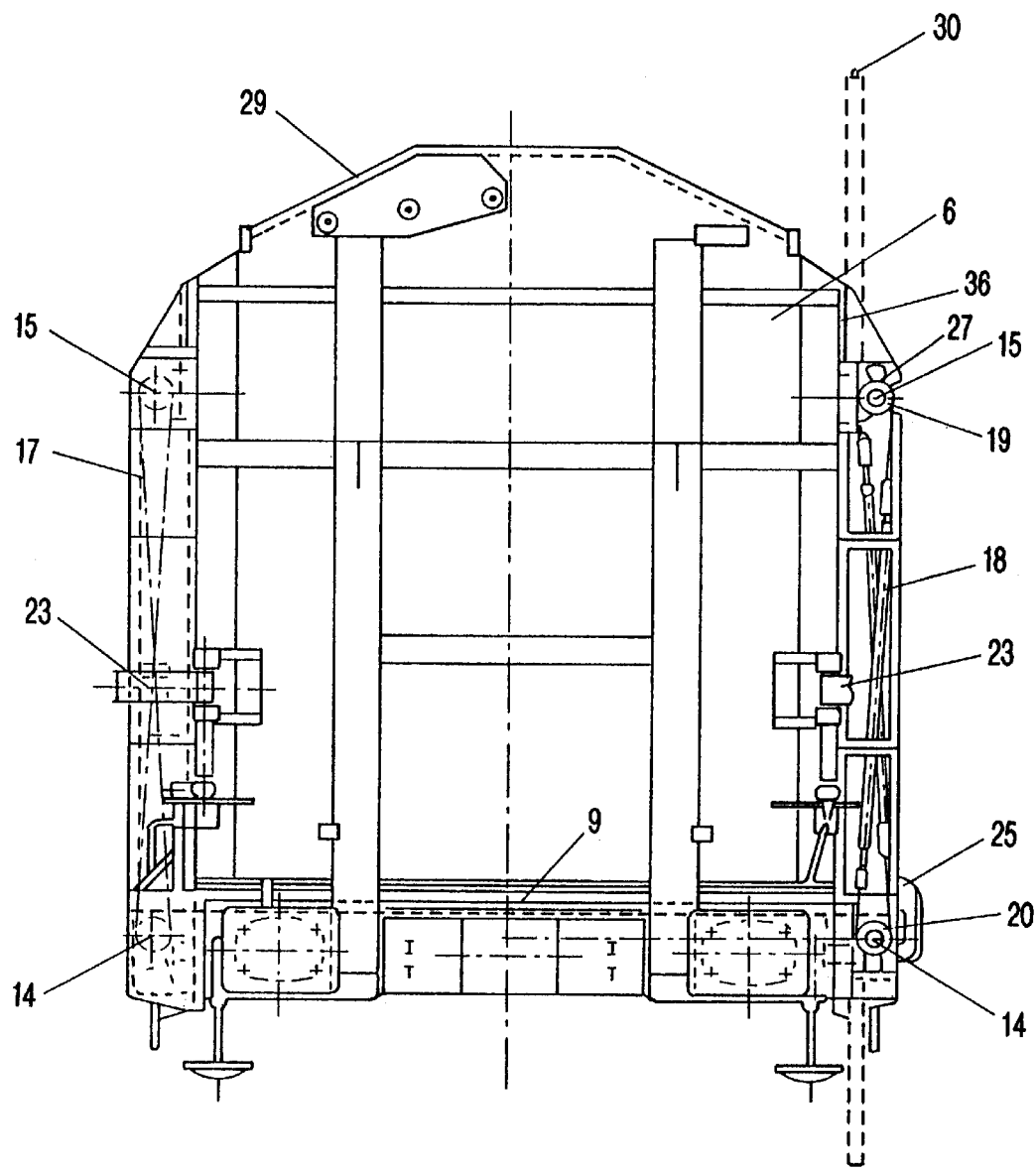
FIG. 3 shows a view of the end wall of the freight car of FIGS. 1 and 2 with a chain drive for actuating the folding doors, whereby partially the housing covers have been removed.
Figure 4:
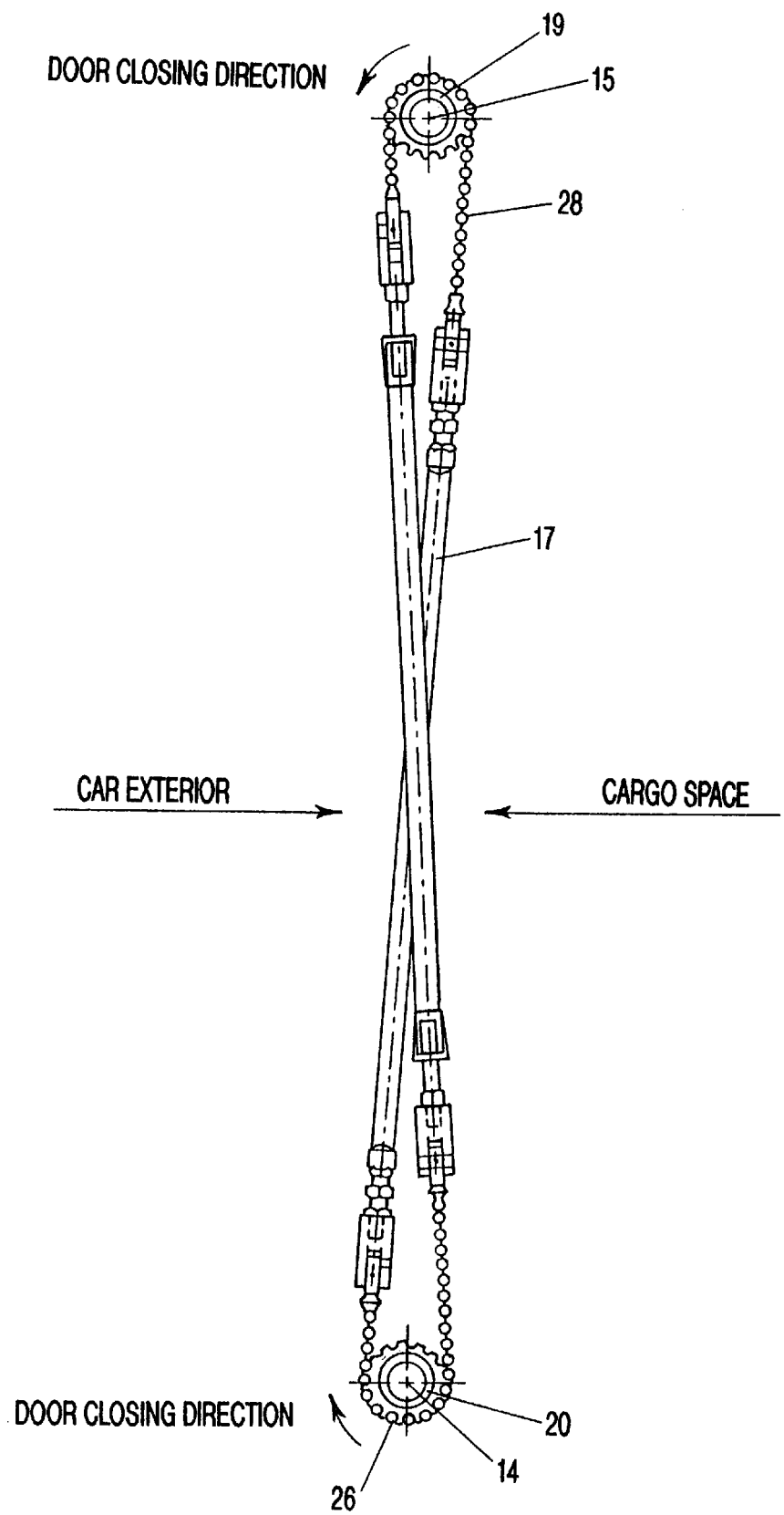
FIG. 4 shows the chain drive of FIG. 3 in an enlarged representation.

The views of FIGS. 2 and 4 illustrate the construction of the actuation of the folding doors whereby the housing of the chain drive to the right in FIG. 3 has been substantially eliminated from the side wall 6 so that the arrangement of the chain drive at the freight car can be seen. Accordingly, each lower folding door 11 or 13 is connected below the bottom 9 by U-shaped fastening consoles 25 fixedly to the corresponding pivot shaft 20 or 21 on which the chain wheel 26 is seated. The pivot shaft 20 extends over half the length of the freight car to the central lateral post 7. It is thus supported at three locations, i.e., at the end wall 6, the center hold 16, and the lateral post 7. In an equivalent manner, the upper folding doors 10, 12 are fastened by pivot shafts 19, 21 which are supported at three locations and, in the area of the end wall 6, are provided with the chain wheel 27. According to FIG. 4, the chain 28 is arranged in a figure eight shape about the chain gears 26, 27, whereby a tensioning device is provided and whereby the chain drive is used for coupling the folding doors and for moving them. The chain 28 is a bendable (flexible) pulling element that could also be in the form of a cable or belt or toothed belt which operates without spring action. It coordinates opening and closing movements of the folding doors 10, 11, respectively, 12, 13 arranged thereat. The force storage means in this context is the balanced weight of the pair of folding doors. This makes it possible that with a simple pulling action at the actuating lever after release of the latching mechanisms their opening without further force expenditure, i.e., quasi automatically, can be carried out. The lower folding doors 11 or 13 will be folded to a position below the car bottom 9 while the respective upper folding doors 10 or 12 are moved into a vertical position in the upward direction. The entire cargo space is thus accessible for loading via the completely open side wall of the freight car 1. For closing, only a minimal pulling action is required for overcoming the frictional forces, for example, pulling at the lower folding door, so that without further force expenditure the closing process of the folding doors takes place substantially automatically. Subsequently, the latching mechanisms for locking the folding doors can be actuated.

FIGS. 5 and 6 illustrate how the cargo space of the freight car provided with folding doors is completely sealed by sealing elements, especially against water and moisture. The gap 37 between the two paired folding doors, for example, the upper folding door 10 and the lower folding door 11, is closed off by a sealing bead 38 which is embodied as a hollow profiled member of an elastic sealing material such as rubber or plastic and which is fastened at the upper folding door 10. The pivot location of the upper folding door is in addition covered by a flexible cover 39 in the form of a tarpaulin against the elements whereby the cover 39 is, on the one hand, connected to the upper longitudinal support 8 and, on the other hand, to the folding door 10 or to the pivot shaft 19 or its bearing. In addition, all folding doors have sealing strips in order to protect the cargo area from the elements. In FIG. 6 they are shown in connection with folding doors 10 and 12. It can be seen that in the vertical direction between the folding doors 10, 12 and the bordering surfaces of the end walls 6 as well as the lateral posts 7 ceiling strips 40 are arranged which in cross-section are L-shaped metal/rubber composite elements.

The container 5 of the freight car 1 according to FIG. 7 can be provided with a pivot cover that is in the form of a net (mesh) so that a complete opening of the freight car can be performed by a simple manual actuation of the pivot cover. For this purpose, each end wall 6 in the upper area is provided with a sheet metal enforcement 41 welded thereto so that the pivot bearings 42 for four pivot arms 43 can be anchored to the end walls 6. The free ends of the pivot arms 43 of each end wall 6 are connected in pairs by steel cables 44 which provide thus a support structure for the net or mesh 45. The steel cables 44 are loaded by springs 46 in order to maintain the required tension.

In the unfolded (open) state of the pivot arms 43 shown in FIG. 7a and 7b, the net or mesh cover of the container closes off the freight car whereby the safety device 45 at both end walls 6 ensures that an accidental opening does not occur. After releasing the safety device 45 by hand, the cover can be pivoted in a simple manner to the left in FIG. 7 as is indicated by the dash-dotted line and the roof of the freight car is thus completely open.

Figure 8A:
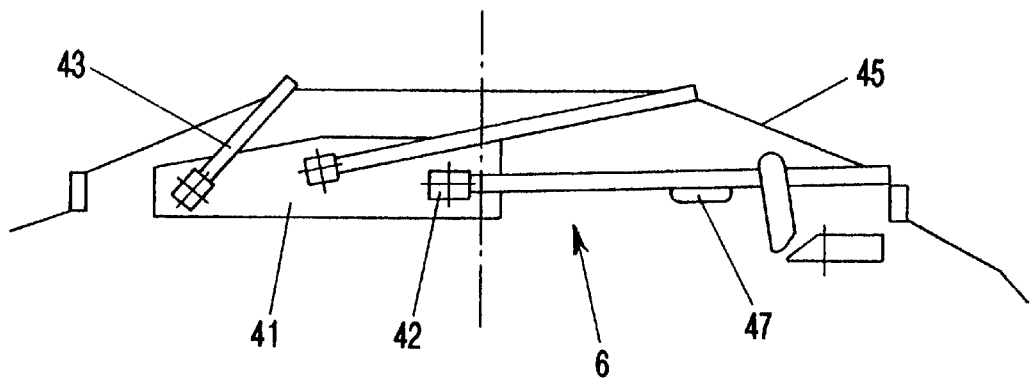
FIGS. 8a,b show another embodiment of the pivot cover in a schematic end view in the closed state (FIG. 8a) and according to FIG. 8b in the open state.
Figure 8B:
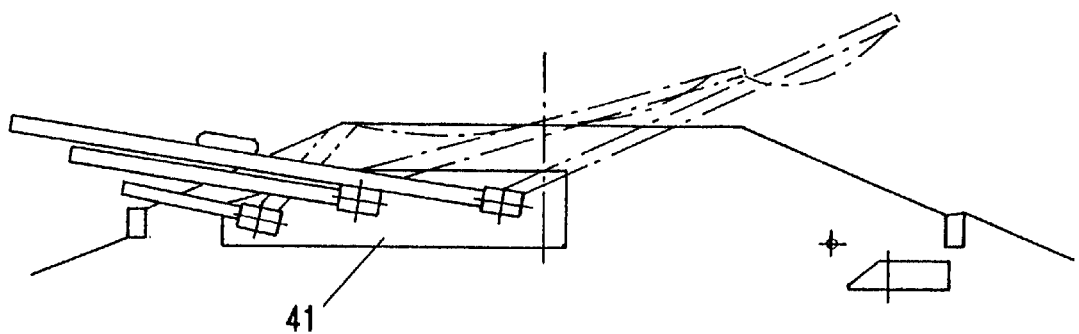

The pivot cover represented in FIG. 8 is embodied, in principle, in the same manner whereby, for simplifying the construction, at each end wall 6 only three pivot arms 43 are used. In this embodiment, in order to facilitate the pivoting action, a grip 47 is provided at the right pivot arm in the drawing. FIG. 8a illustrates the closed position of the pivot cover, and FIG. 8b shows the open position of the cover which can be embodied as a net or a tarpaulin.

Figure 9B:
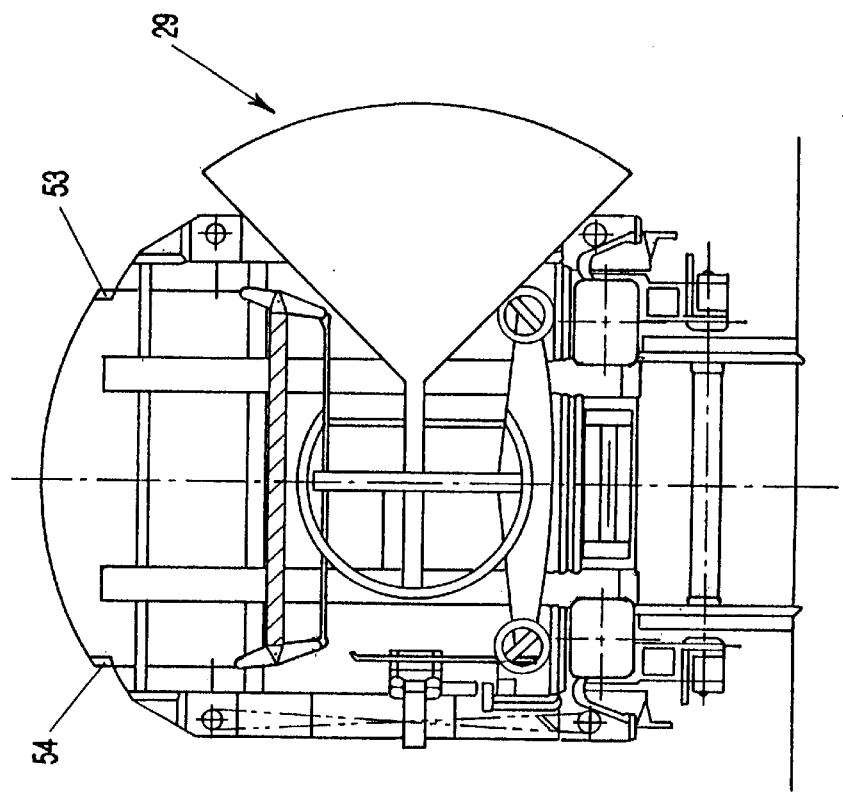
FIGS. 9a,b show an end view of the freight car with a solid cover in the closed state (FIG. 9a) and according to FIG. 9b in the open state.
Figure 9A:
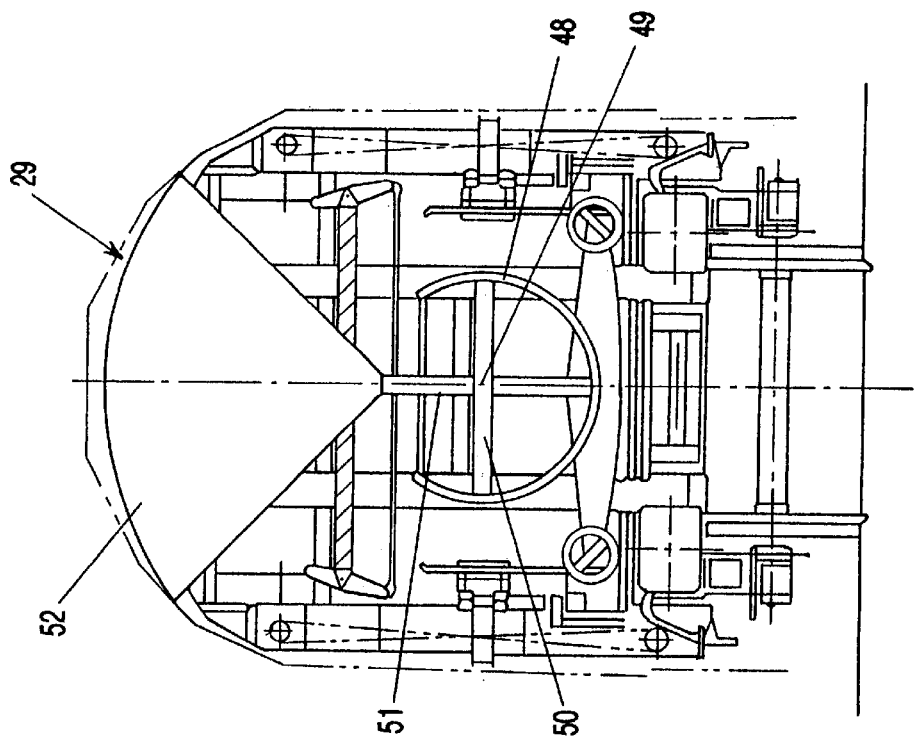

A further embodiment of the pivot cover is shown in FIG. 9. At each end wall 6 a pivot actuator in the form of a wheel 48 is provided that can be pivoted about a pivot axis 49 by hand into the closed position represented in FIG. 9a and returned into the open position shown in FIG. 9b. Each wheel 48 has a cross-shaped wheel flange 49 whereby in the closed position the cross bar 51 extending vertically has connected thereto a circular segment member 52 consisting of sheet metal which is substantially triangular and has an outer contour matching the contour of the cover. The two circular segment members 52 support a solid cover which is not represented in detail but is comprised preferably of a light-weight material that has a honeycomb structure and covers the entire upper car opening. In the closed state, the cover rests at the sealing strips 53, 54 extending in the longitudinal direction so that the cargo space is completely sealed off, i.e., by the folding doors as well as at the cover and is thus substantially hermetically sealed against the elements(wind, rain, snow etc.), and is especially watertight. For opening the roof, the pivot cover 29 is pivoted according to FIG. 9b completely to the right onto the side of the freight car by the actuating wheel 48.

According to the embodiment of FIG. 10, the freight car may be provided with an unloading device in the form of an air bag 31. The air bag is comprised of an airtight envelope of a suitable linen material that, according to the solid line shown in FIG. 10, forms a blanket positioned in the loading position over the entire surface area of the bottom 9 of the freight car. It also extends vertically within the vertical center plane of the freight car so that it is positioned opposite the unloading openings defined by the folding doors 32, 33, 34, 35. It extends over the entire height of the freight car so that it forms a kind of partition which divides the cargo space into two compartments which may receive the product to be transported, for example, a dry bulk material such as wood chips. When the air bag 31 is filled with air, it will fill out the volume that is indicated by dashed lines so that the envelope fills the entire volume of the cargo space of the freight car. The transported goods, after opening of the folding doors 32–35, will thus be completely pushed outwardly through the provided unloading openings across the edge of the bottom 9.

The specification incorporates by reference the disclosure of European priority document 97 122 016.5 of Dec. 13, 1997.

The present invention is, of course, in no way restricted to the specific disclosure of the specification and drawing, but also encompasses any modifications within the scope of the appended claims.

What is claimed is:

1. Comprising:

an undercarriage (3);

a running carriage (2) connected to said undercarriage (3);

a container (5) connected to said undercarriage (3);

said container (5) comprising sidewalls, positioned in a longitudinal direction of said freight car, and closed end walls (6) extending transversely to said sidewalls at opposite ends of said freight car;

said sidewalls having lateral posts (7) and longitudinal supports (8) connecting said end walls (6) and said lateral posts (7);

at least one of said sidewalls having a closable opening for loading and unloading goods to be transported in said freight car;

wherein said at least one opening extends over the entire length of said sidewall;

wherein said at least one sidewall comprises at least one pair of folding doors (11, 12; 13, 14; 32, 33; 34, 35) arranged in a common vertical plane for closing said opening in a closed position of said folding doors, wherein each one of said folding doors (10, 11, 12, 13, 32, 33; 34, 35) of said pair has a horizontal pivot axle (14, 15);

wherein said horizontal pivot axle (14) of a first one of said folding doors (10, 11, 12; 13, 32, 33; 34, 35) of said pair is provided at said undercarriage (3) and said first folding door (10, 11, 12; 13, 32, 33; 34, 35) covers a lower part of said sidewall;

wherein said horizontal pivot axle (15) of a second one of said folding doors (10, 11, 12; 13, 32; 34, 35) of said pair is provided in the vicinity of said longitudinal support (8) and said second folding door (10, 11, 12; 13, 32, 33; 34, 35) covers an upper part of said sidewall; and a coupling device connecting said first and second folding doors (10, 11, 12; 13, 32, 33; 34, 35), wherein said coupling device comprises a chain drive having a chain (18) and a first chain gear (16) and a second chain gear (27), wherein said chain (28) is guided about said first and second chain gears (26, 27) in a figure eight arrangement, wherein said first folding door (11; 13; 33; 35) has a first pivot shaft (19, 20) defining said horizontal pivot axle (14) and wherein said second folding door (10; 12; 32; 34) has a second pivot shaft (21, 22) defining said horizontal pivot axle (15), wherein said first chain gear (26) is connected to an end of said first pivot shaft (19, 20) and said second chain gear (27) is connected to an end of said second pivot shaft (21, 22), wherein said first folding door (11, 13, 33, 35) has a smaller height and a lower weight than said second folding door (10, 12, 32, 34).

2. A freight car according to claim 1, comprising a releasable latching mechanism (23) securing said folding doors (10, 11, 12, 13, 32, 33, 34, 35) in said common vertical plane in said closed position.

3. A freight car according to claim 1, comprising releasable latching mechanism (23, 24) securing said folding doors (10, 11, 12, 13, 32, 33, 34, 35) in said common vertical plane for closing said opening, wherein said releasable latching mechanism are located at opposite ends of said folding doors (10, 11, 12, 13, 15 32, 33, 34, 35) in said longitudinal direction of said freight car.

4. A freight car according to claim 1, comprising a stop (36) securing said second folding door (10, 12, 32, 34) substantially vertically in an open position.

5. A freight car according to claim 1, wherein said folding doors (10, 11, 12, 13, 32, 33, 34, 35) have sealing elements (30, 38, 40) sealing said folding doors relative to one another and relative to said container (5).

6. A freight car according to claim 5, wherein one of said sealing elements is a horizontal sealing bead (38), extending in a gap formed between said folding doors in said closed position over the entire length of said folding doors and connected to a horizontal edge of one of said folding doors, and wherein other ones of said sealing elements are vertical sealing strips (40) connected to edges of said folding doors, extending perpendicularly to said horizontal edge, or connected to vertical edges of said container (5).

7. A freight car according to claim 6, wherein said sealing strips (40) are L-shaped and consist of a metal/rubber composite and wherein said sealing bead (38) is a hollow profiled member.

8. A freight car according to claim 1, further comprising a flexible cover (39) for sealing said second folding door (10, 12, 32, 34) in the area of said pivot axle (15), wherein said flexible cover (39) is fastened to said container (5) and to said second folding door.

9. A freight car according to claim 8, wherein said flexible cover (39) is connected to said longitudinal support (8) and to said pivot axis (19, 20).

10. A freight car according to claim 1, wherein said container (5) comprises a pivotable cover.

11. A freight car according to claim 10, wherein, said cover is a pivotable lid (29), wherein said container (5) comprises holding devices (41, 42, 43; 48, 49, 50, 51, 52) connected to each one of said end walls so as to be pivotable to one side, said holding devices supporting said pivotable lid (29).

12. A freight car according to claim 11, wherein said holding devices are circular segment members (52) connected by a pointed end of said circular segment members (52) to said end walls on a vertical longitudinal center plane of said freight car so as to be pivotable to one side of said freight car, wherein said circular segment members (52) have a pivot actuator (48).

13. A freight car according to claim 12, wherein said pivot actuator (48) is comprised of a hand wheel (48) having a cross-shaped wheel flange (50), wherein said cross-shaped wheel flange (50) has a cross-bar that, in said closed position of said pivotable cover, is vertical, wherein said circular segment is connected to said vertical cross-bar and wherein said pivotable cover is comprised of a composite material having a honeycomb structure.

14. A freight car according to claim 10, wherein said cover is comprised of a flexible material, wherein said container (5) has holding devices (41, 42, 43) connected to said end walls (6), each said holding device (41, 42, 43) having at least three spaced-apart pivot arms (41, 42, 43), wherein a longitudinal edge of said cover is connected to said container (5) in the vicinity of one of said longitudinal supports (8) and the opposite longitudinal edge of said cover is connected to said pivot arm (43) of each one of said holding devices that, when said cover is closed, is positioned at the opposite one of said longitudinal supports (8).

15. A freight car according to claim 14, wherein said pivot arms (41, 42, 43) are connected to and are pivotable in a horizontal plane relative to said end walls (6) in a spaced-apart arrangement relative to one another.

16. A freight car according to claim 14, wherein said holding devices comprise a tensioning cables 44 extending in said longitudinal direction of said freight car and connecting free ends of said pivot arms (41, 42, 43) of oppositely arranged ones of said holding devices do one another.

17. A freight car according to claim 15, wherein said cover is connected to said tensioning cables (44).

18. A freight car according to claim 10, comprising a securing device for locking said pivotable cover in said closed position.

19. A freight car according to claim 1, comprising an unloading device in the form of an airbag (31) comprised, of an inflatable, airtight envelope resting on the bottom (9) of said container (5), wherein said airbag (31) in the inflated state occupies the volume of said container (5).

20. A freight car according to claim 19, wherein said airbag (31) in the deflated state covers said bottom (9) and provides a vertical wall extending over the entire height of said container (5) and positioned opposite said opening.

21. A freight car according to claim 1, wherein both of said sidewalls have said openings with said folding doors for closing said openings.

22. A freight car according to claim 21, wherein said sidewalls are divided at half a sidewall length in said longitudinal direction and wherein two of said folding doors (10, 12; 11, 13) are arranged respectively at both of said sidewalls.

23. A freight car according to claim 1, wherein at least one of said sidewalls is divided at half a sidewall length in said longitudinal direction and wherein two of said folding doors (10, 12; 11, 13) are arranged at said at least one sidewall.

24. A freight car comprising:
an undercarriage (3);
a running carriage (2) connected to said undercarriage (3);
a container (5) connected to said undercarriage (3);
said container (5) comprising sidewalls, positioned in a longitudinal direction of said freight car, and closed end walls (6) extending transversely to said sidewalls at opposite ends of said freight car;
said sidewalls having lateral posts (7) and longitudinal supports (8) connecting said end walls (6) and said lateral posts (7);
at least one of said sidewalls having a closable opening for loading and unloading goods to be transported in said freight car;
wherein said at least one opening extends over the entire length of said sidewall;
wherein said at least one sidewall comprises at least one pair of folding doors (11, 12; 13, 14; 32, 33; 34, 35) arranged in a common vertical plane for closing said opening in a closed position of said folding doors;
wherein each one of said folding doors (10, 11, 12, 13, 32, 33; 34, 35) of said pair has a horizontal pivot axle (14, 15), and wherein said folding doors (10, 11, 12, 13, 32, 33, 34, 35) comprise a central hold (16);
wherein said horizontal pivot axle (14) of a first one of said folding doors (10, 11, 12; 13, 32, 33; 34, 35) of said pair is provided at said undercarriage (3) and said first folding door (10, 11, 12; 13, 32, 33; 34, 35) covers a lower part of said sidewall;
wherein said horizontal pivot axle (15) of a second one of said folding doors (10, 11, 12; 13, 32; 34, 35) of said pair is provided in the vicinity of said longitudinal support (8) and said second folding door (10, 11, 12; 13, 32, 33; 34, 35) covers an upper part of said sidewall.

25. A freight car comprising:
an undercarriage (3);
a running carriage (2) connected to said undercarriage (3);
a container (5) connected to said undercarriage (3);
said container (5) comprising sidewalls, positioned in a longitudinal direction of said freight car, and closed end walls (6) extending transversely to said sidewalls at opposite ends of said freight car;
said sidewalls having lateral posts (7) and longitudinal supports (8) connecting said end walls (6) and said lateral posts (7);
at least one of said sidewalls having a closable opening for loading and unloading goods to be transported in said freight car;
wherein said at least one opening extends over the entire length of said sidewall;
wherein said at least one sidewall comprises at least one pair of folding doors (11, 12; 13, 14; 32, 33; 34, 35) arranged in a common vertical plane for closing said opening in a closed position of said folding doors,
wherein each one of said folding doors (10, 11, 12, 13, 32, 33; 34, 35) of said pair has a horizontal pivot axle (14, 15);
wherein said horizontal pivot axle (14) of a first one of said folding doors (10, 11, 12; 13, 32, 33; 34, 35) of said pair is provided at said undercarriage (3) wherein said first folding door (10, 11, 12; 13, 32, 33; 34, 35) covers a lower part of said sidewall, and wherein said first folding door (11, 13 33, 35) is positioned lower than a bottom of said container (5),
wherein said horizontal pivot axle (15) of a second one of said folding doors (10, 11, 12; 13, 32; 34, 35) of said pair is provided in the vicinity of said longitudinal support (8) and said second folding door (10, 11, 12; 13, 32, 33; 34, 35) covers an upper part of said sidewall.

* * * * *